US012608606B2

(12) United States Patent (10) Patent No.: US 12,608,606 B2
Liao et al. (45) Date of Patent: Apr. 21, 2026

(54) DATA PROCESSING METHOD AND APPARATUS

(71) Applicant: HUAWEI TECHNOLOGIES CO., LTD., Guangdong (CN)

(72) Inventors: Yi Liao, Shenzhen (CN); Bowen Li, Shenzhen (CN); Hao Zheng, Shenzhen (CN); Xin Jiang, Hong Kong (CN); Qun Liu, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 796 days.

(21) Appl. No.: 17/964,165

(22) Filed: Oct. 12, 2022

(65) Prior Publication Data

US 2023/0048031 A1 Feb. 16, 2023

Related U.S. Application Data

(63) Continuation of application No. PCT/CN2021/078390, filed on Mar. 1, 2021.

(30) Foreign Application Priority Data

Apr. 13, 2020 (CN) .......................... 202010286915.9

(51) Int. Cl.
*G06N 3/08* (2023.01)
*G06F 40/103* (2020.01)
*G06F 40/279* (2020.01)

(52) U.S. Cl.
CPC ............. *G06N 3/08* (2013.01); *G06F 40/103* (2020.01); *G06F 40/279* (2020.01)

(58) Field of Classification Search
CPC ........ G06N 3/08; G06F 40/103; G06F 40/279
See application file for complete search history.

(56) References Cited

U.S. PATENT DOCUMENTS

2022/0269863 A1 * 8/2022 Araki .................... G06F 40/169
2023/0418880 A1 * 12/2023 Roy .................... G06F 16/3344

FOREIGN PATENT DOCUMENTS

CN 110196894 A * 9/2019 ......... G06F 16/3344
CN 111611790 A * 9/2020 ........... G06F 40/274
(Continued)

OTHER PUBLICATIONS

Liao Yi et al: Language ModelGeneration in "Probabilistically Masked Language Model Capable of Autoregressive Generation in Arbitrary Word Order" Apr. 24, 2020(Apr. 24, 2020) XP093063323.
(Continued)

*Primary Examiner* — Mohammad K Islam

(57) ABSTRACT

Relating to the field of artificial intelligence, and specifically relating to the field of natural language processing, a data processing method includes and an apparatus performs: determining original text samples, where masking processing is not performed on the original text samples; and performing mask processing on the original text samples to obtain mask training samples, where the mask processing makes mask proportions of the mask training samples unfixed, and the mask training samples each are used to train a pretrained language model PLM. Training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

20 Claims, 8 Drawing Sheets

(56)     References Cited

FOREIGN PATENT DOCUMENTS

| | | | | | |
|---|---|---|---|---|---|
| CN | 111309908 B | * | 8/2023 | ............. | G06F 16/35 |
| WO | WO-2021208612 A1 | * | 10/2021 | ............. | G06F 40/30 |
| WO | WO-2024191475 A1 | * | 9/2024 | ............. | G06F 40/56 |

OTHER PUBLICATIONS

International Search Report dated Jun. 7, 2021, issued for International Application No. PCT/CN2021/078390 (11 pages).
Extended European Search Report dated Jul. 20, 2023, issued for European Application No. 21789181.1 (10 pages).

* cited by examiner

300

300

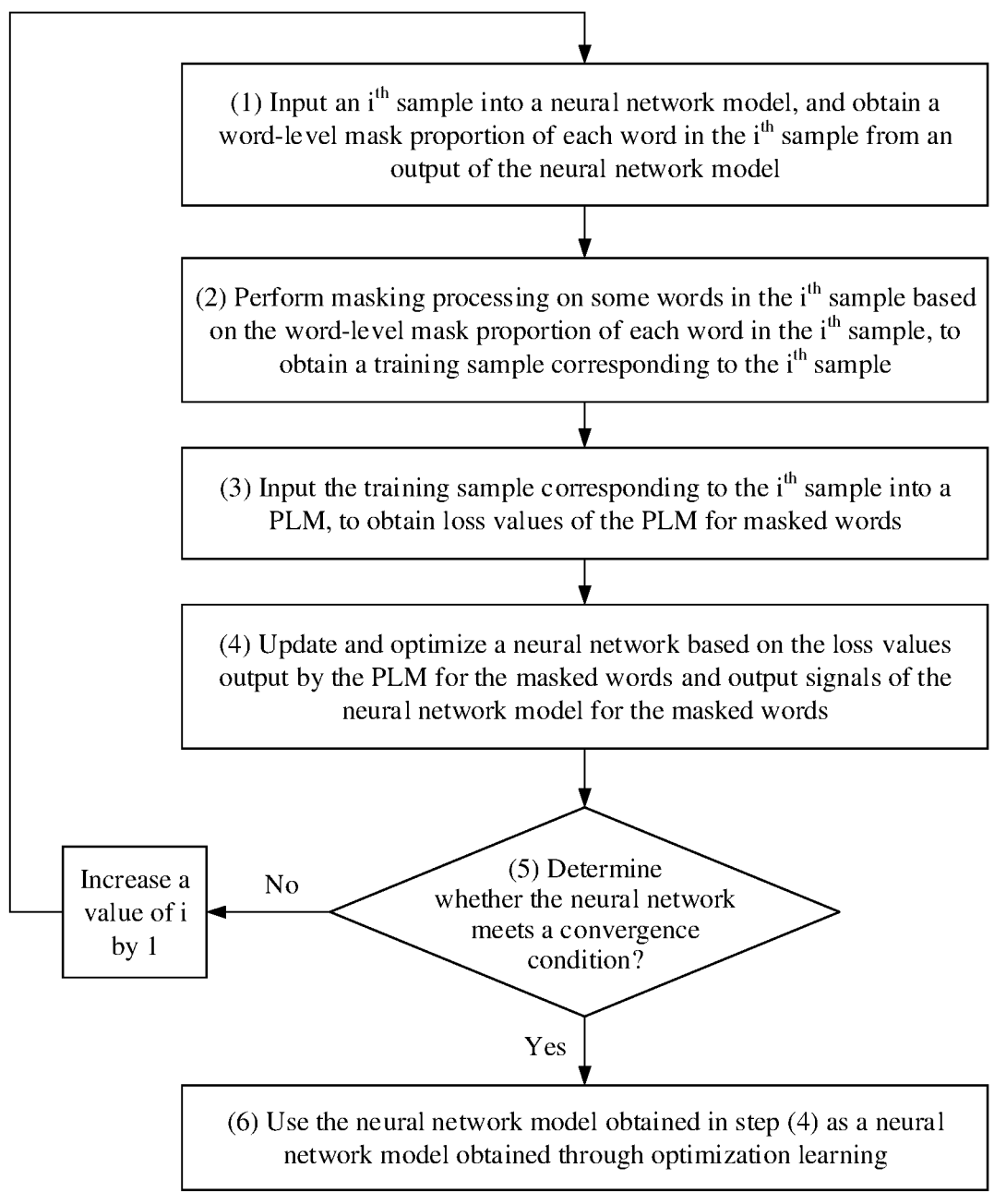

(1) Input an i$^{th}$ sample into a neural network model, and obtain a word-level mask proportion of each word in the i$^{th}$ sample from an output of the neural network model (2) Perform masking processing on some words in the i$^{th}$ sample based on the word-level mask proportion of each word in the i$^{th}$ sample, to obtain a training sample corresponding to the i$^{th}$ sample (3) Input the training sample corresponding to the i$^{th}$ sample into a PLM, to obtain loss values of the PLM for masked words (4) Update and optimize a neural network based on the loss values output by the PLM for the masked words and output signals of the neural network model for the masked words Increase a value of i by 1

No (5) Determine whether the neural network meets a convergence condition?

Yes (6) Use the neural network model obtained in step (4) as a neural network model obtained through optimization learning

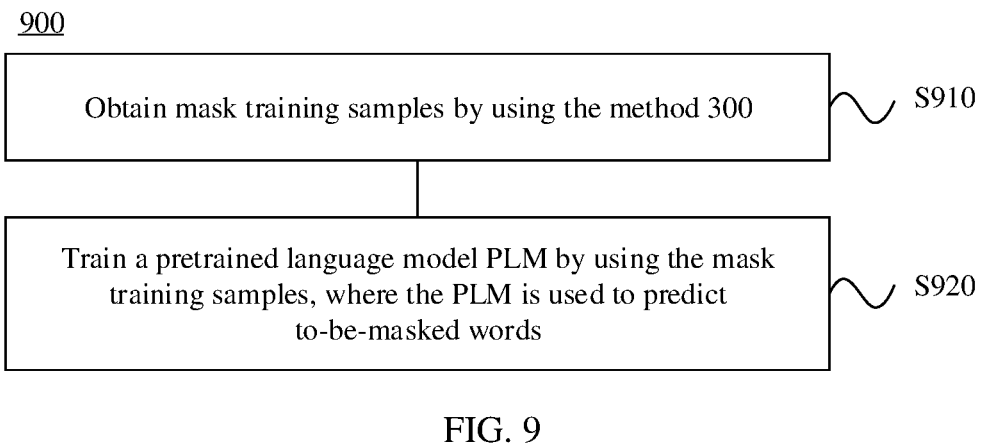

Obtain mask training samples by using the method 300    S910

Train a pretrained language model PLM by using the mask training samples, where the PLM is used to predict to-be-masked words    S920

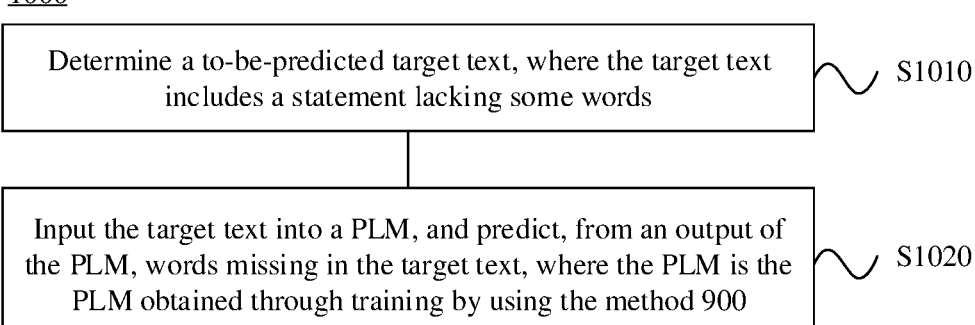

Determine a to-be-predicted target text, where the target text includes a statement lacking some words    S1010

Input the target text into a PLM, and predict, from an output of the PLM, words missing in the target text, where the PLM is the PLM obtained through training by using the method 900    S1020

FIG. 10

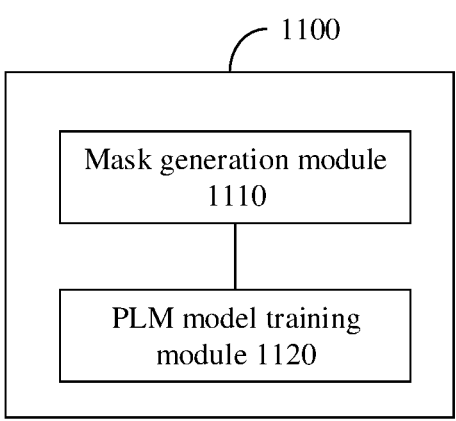

1100

Mask generation module 1110

PLM model training module 1120

DATA PROCESSING METHOD AND APPARATUS

CROSS-REFERENCE TO RELATED APPLICATIONS

This application is a continuation of International Application No. PCT/CN2021/078390, filed on Mar. 1, 2021, which claims priority to Chinese Patent Application No. 202010286915.9, filed Apr. 13, 2020. The disclosures of the aforementioned applications are hereby incorporated by reference in their entireties.

TECHNICAL FIELD

This disclosure relates to the field of artificial intelligence, and specifically, to a data processing method and apparatus.

BACKGROUND

Natural language processing (NLP) is a technology that enables a computer to understand and process a natural human language, and is an important technical means to implement artificial intelligence. A pretrained language model (PLM) is an important general model in the NLP field emerging in recent years. A training solution of the PLM is a research hotspot in this field. The training solution of the PLM is improved in two directions: first, improving a natural language understanding capability of the PLM; second, accelerating a model training speed (that is, accelerating a model convergence speed). A common training solution of the PLM is referred to as a masked language model (MLM).

A training principle of the MLM is to enable the PLM to learn a capability to capture text context information. In a training solution of the MLM, a training sample of the PLM is a text obtained after mask processing, that is, a sentence in which some words are replaced with special marker symbols (for example, [MASK]). For example, an original text is "Jin tian shi ging lang de zhou liu", and a text obtained after mask processing is "Jin [MASK] shi ging [MASK] de zhou liu". The text obtained after mask processing is input into the PLM, and the PLM needs to predict that to-be-masked words are "tian" and "lang". The training sample of the PLM may be referred to as a mask training sample.

In the current training solution of the MLM, a word in each text is selected according to a random policy to perform mask processing in a fixed mask proportion, to obtain a mask training sample. The mask training sample obtained in this way has a problem that modes are undiversified. Therefore, training the PLM by using such a mask training sample may bring a bottleneck in the natural language understanding capability to the PLM.

SUMMARY

This disclosure provides a data processing method and apparatus, to improve a natural language understanding capability of a PLM.

According to a first aspect, a data processing method is provided. The method includes: determining original text samples, where masking processing is not performed on the original text samples; and performing mask processing on the original text samples to obtain mask training samples, where the mask processing makes mask proportions of the mask training samples unfixed, and the mask training samples each are used to train a pretrained language model PLM.

The mask proportions of the mask training samples include a text-level mask proportion and/or a word-level mask proportion.

The text-level mask proportion indicates a proportion of masked words in a text in all words in the text.

The text-level mask proportion may also be referred to as a sentence-level mask proportion or a text-level mask proportion.

The word-level mask proportion indicates a probability that a word is masked. In a text, each word has a word-level mask proportion.

The word-level mask proportion may also be referred to as a mask probability of a word.

That the mask proportions of the mask training samples are unfixed includes:

text-level mask proportions of different samples in the mask training samples are not exactly the same; and/or word-level mask proportions of words in any of the mask training samples are not exactly the same.

It should be understood that training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

A plurality of implementations may be used to perform mask processing on the original text samples to obtain mask training samples.

With reference to the first aspect, in a possible implementation of the first aspect, the performing mask processing on the original text samples to obtain mask training samples includes: generating a text-level mask proportion of each of the original text samples by using a prior probability distribution model, where the prior probability distribution model makes text-level mask proportions of different samples in the original text samples not exactly the same; and performing masking processing on a corresponding sample based on the text-level mask proportion of each of the original text samples, to obtain the mask training samples.

Optionally, a probability value range length of the prior probability distribution model is not less than 40%.

It should be understood that training the PLM by using the mask training samples whose text-level mask proportions are unfixed can enhance mode diversity of the training samples of the PLM. Therefore, features learned by the PLM are also diversified, and a natural language understanding capability of the PLM obtained through training can be improved.

With reference to the first aspect, in a possible implementation of the first aspect, the performing mask processing on the original text samples to obtain mask training samples includes: obtaining a word-level mask proportion of each word in a first text sample in the original text samples, where word-level mask proportions of different words in the first text sample are not exactly the same; and performing masking processing on some words in the first text sample based on the word-level mask proportion of each word in the first text sample, to obtain a first training sample in the mask training samples.

Optionally, the performing masking processing on some words in the first text sample based on the word-level mask proportion of each word in the first text sample, to obtain a first training sample in the mask training samples includes:

performing masking processing on first S words or first G % words in the first text sample in descending order of the word-level mask proportions, to obtain the first training sample, where S is a positive integer whose value is less than a total quantity of words in the first text sample, and G is an integer greater than 0 and less than 100.

It should be understood that, words in each of the original text samples have mask proportions that are not exactly the same, and during the mask processing of the original text samples, a mask policy is determined based on a word-level mask proportion of each word, instead of being determined according to a random policy, so that repeated features of the mask training samples can be reduced or avoided, and further the PLM can be prevented from repeatedly learning a same sample in a training process to some extent, and fast model convergence can be implemented.

A plurality of implementations may be used to obtain a word-level mask proportion of each word in a first text sample in the original text samples, so that word-level mask proportions of different words in the first text sample are not exactly the same.

With reference to the first aspect, in a possible implementation of the first aspect, the obtaining a word-level mask proportion of each word in a first text sample in the original text samples includes: generating a word-level mask proportion of each word in the first text sample by using a prior probability distribution model, where the prior probability distribution model makes word-level mask proportions of different words in the first text sample not exactly the same.

With reference to the first aspect, in a possible implementation of the first aspect, the obtaining a word-level mask proportion of each word in a first text sample in the original text samples includes: inputting the first text sample into a neural network model, and obtaining the word-level mask proportion of each word in the first text sample from an output of the neural network model, where the output of the neural network model is a word-level mask proportion of each word in an input text, the neural network model is obtained through optimization learning by using the following steps, and an initial value of i is 1:

(1) input an $i^{th}$ sample in the original text samples into the neural network model, and obtain a word-level mask proportion of each word in the $i^{th}$ sample from an output of the neural network model;

(2) perform masking processing on some words in the $i^{th}$ sample based on the word-level mask proportion of each word in the $i^{th}$ sample, to obtain a training sample corresponding to the $i^{th}$ sample;

(3) input the training sample corresponding to the $i^{th}$ sample into the PLM, to obtain loss values output by the PLM for masked words;

(4) update and optimize a neural network model based on the loss values output by the PLM for the masked words and output signals of the neural network model for the masked words;

(5) determine whether the neural network model meets a convergence condition, and if yes, go to step (6); or if no, increase the value of i by 1, and go to step (1); and (6) use the neural network model obtained in step (4) as the neural network model obtained through optimization learning.

Optionally, the step (3) includes: performing one training update on the PLM by using the training sample corresponding to the $i^{th}$ sample; and inputting the training sample corresponding to the $i^{th}$ sample into the training updated PLM, to obtain loss values output by the training updated PLM for the masked words, where the step (4) includes:

updating and optimizing the neural network model based on the loss values of the training updated PLM for the masked words and output signals of the neural network model for the masked words.

It should be understood that the generating the word-level mask proportion of each word in each of the original text samples by using the neural network model obtained through optimization learning is equivalent to performing optimization learning on the mask policy, so that a better mask training sample can be generated. Therefore, training the PLM by using such a mask training sample can implement fast model convergence of the PLM and improve a natural language understanding capability of the PLM.

The PLM is trained and updated when optimization learning is performed on the word-level mask proportion used to generate the word, so that a better mask training sample can be further generated. Training the PLM by using such a mask training sample can implement model fast convergence of the PLM and improve a natural language understanding capability of the PLM.

According to a second aspect, a data processing method is provided. The method includes: obtaining mask training samples by using the method in the first aspect; and training a pretrained language model PLM by using the mask training samples, where the PLM is used to predict to-be-masked words.

Training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

According to a third aspect, a data processing method is provided. The method includes: determining a to-be-predicted target text, where the target text includes a statement lacking some words; and inputting the target text into a pretrained language model PLM, and predicting, from an output of the PLM, words missing in the target text, where the PLM is obtained through training by using the method in the second aspect.

According to a fourth aspect, a data processing apparatus is provided. The apparatus includes a first processing unit and a second processing unit. The first processing unit is configured to determine original text samples, where masking processing is not performed on the original text samples. The second processing unit is configured to perform mask processing on the original text samples to obtain mask training samples, where the mask processing makes mask proportions of the mask training samples unfixed, and the mask training samples each are used to train a pretrained language model PLM.

The mask proportions of the mask training samples include a text-level mask proportion and/or a word-level mask proportion. For details, refer to the foregoing description. Details are not described herein again.

With reference to the fourth aspect, in a possible implementation of the fourth aspect, the second processing unit is configured to: generate a text-level mask proportion of each of the original text samples by using a prior probability distribution model, where the prior probability distribution model makes text-level mask proportions of different samples in the original text samples not exactly the same; and perform masking processing on a corresponding sample based on the text-level mask proportion of each of the original text samples, to obtain the mask training samples.

Optionally, a probability value range length of the prior probability distribution model is not less than 40%.

With reference to the fourth aspect, in a possible implementation of the fourth aspect, the second processing unit is configured to: obtain a word-level mask proportion of each word in a first text sample in the original text samples, where word-level mask proportions of different words in the first text sample are not exactly the same; and perform masking processing on some words in the first text sample based on the word-level mask proportion of each word in the first text sample, to obtain a first training sample in the mask training samples.

With reference to the fourth aspect, in a possible implementation of the fourth aspect, the second processing unit is configured to generate a word-level mask proportion of each word in the first text sample by using a prior probability distribution model, where the prior probability distribution model makes word-level mask proportions of different words in the first text sample not exactly the same.

With reference to the fourth aspect, in a possible implementation of the fourth aspect, the second processing unit is configured to input the first text sample into a neural network model, and obtain the word-level mask proportion of each word in the first text sample from an output of the neural network model, where the output of the neural network model is a word-level mask proportion of each word in an input text, the neural network model is obtained through optimization learning by using the foregoing described step 1 to step 6, and an initial value of i is 1. For details, refer to the foregoing description. Details are not described herein again.

With reference to the fourth aspect, in a possible implementation of the fourth aspect, the second processing unit is configured to perform masking processing on first S words or first G % words in the first text sample in descending order of the word-level mask proportions of the words, to obtain the first training sample, where S is a positive integer whose value is less than a total quantity of words in the first text sample, and G is an integer greater than 0 and less than 100.

According to a fifth aspect, a data processing apparatus is provided. The apparatus includes: a first processing unit, configured to obtain mask training samples by using the method in the first aspect; and a second processing unit, configured to train a pretrained language model PLM by using the mask training samples, where the PLM is used to predict to-be-masked words.

According to a sixth aspect, a data processing apparatus is provided. The apparatus includes: a first processing unit, configured to determine a to-be-predicted target text, where the target text includes a statement lacking some words; and a second processing unit, configured to input the target text into a pretrained language model PLM, and predict, from an output of the PLM, words missing in the target text, where the PLM is obtained through training by using the method in the second aspect.

According to a seventh aspect, a data processing apparatus is provided. The apparatus includes: a memory, configured to store a program; and a processor, configured to execute the program stored in the memory, where when the program stored in the memory is being executed, the processor is configured to perform the method in the first aspect, the second aspect, or the third aspect.

According to an eighth aspect, a computer-readable medium is provided. The computer-readable medium stores program code executed by a device, and the program code includes instructions used to perform the method in the first aspect, the second aspect, or the third aspect.

According to a ninth aspect, a computer program product including instructions is provided. When the computer program product is run on a computer, the computer is enabled to perform the method in the first aspect, the second aspect, or the third aspect.

According to a tenth aspect, a chip is provided. The chip includes a processor and a data interface, and the processor reads, through the data interface, instructions stored in a memory, to perform the method in the first aspect, the second aspect, or the third aspect.

Optionally, in an implementation, the chip may further include a memory, the memory stores instructions, the processor is configured to execute the instructions stored in the memory, and when the instructions are executed, the processor is configured to perform the method in the first aspect, the second aspect, or the third aspect.

According to an eleventh aspect, an electronic device is provided. The electronic device includes the apparatus in the fourth aspect, the fifth aspect, the sixth aspect, or the seventh aspect.

In the solution provided in this disclosure, training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

BRIEF DESCRIPTION OF DRAWINGS

FIG. 7 is a schematic flowchart of optimization learning of a neural network model used to generate a word-level mask proportion of a word according to an embodiment of this disclosure;

FIG. 9 is a schematic flowchart of a data processing method according to another embodiment of this disclosure;

FIG. 10 is a schematic flowchart of a data processing method according to still another embodiment of this disclosure;

FIG. 11 is a schematic block diagram of a data processing apparatus according to an embodiment of this disclosure;

DESCRIPTION OF EMBODIMENTS

The following describes technical solutions of this disclosure with reference to accompanying drawings.

Natural language processing (NLP) is a technology that enables a computer to understand and process a natural human language, and is an important technical means to implement artificial intelligence (AI). For example, the NLP may cover the following plurality of downstream tasks: sentiment analysis, part-of-speech analysis, intent analysis, named entity recognition, reading comprehension, logical reasoning, machine translation, conversational robot, or the like. A pretrained language model (PLM) is an important general model in the NLP field emerging in recent years. The PLM has good results in most of the downstream tasks in the NLP

FIELD

A common training solution of the PLM is referred to as a masked language model (MLM). A training principle of the MLM is to enable the PLM to learn a capability to capture text context information.

Figure 1:
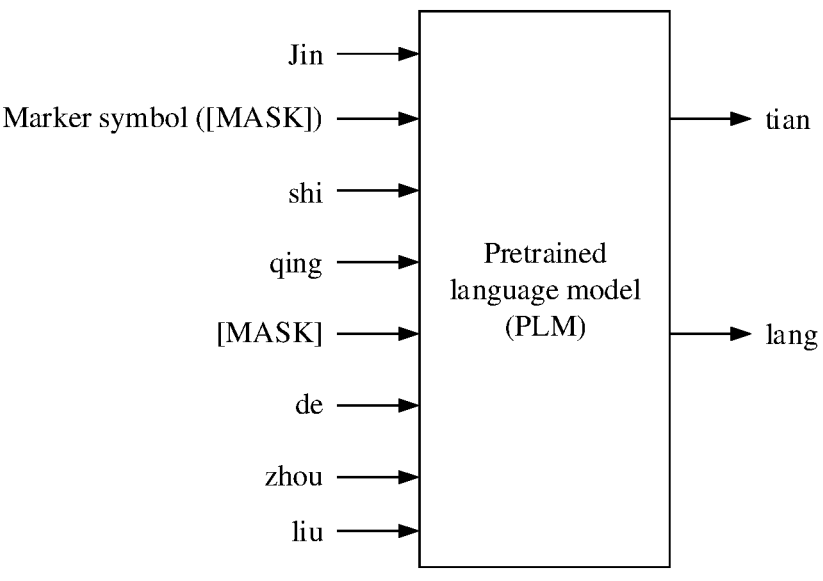
FIG. 1 is a schematic diagram of a training principle of a pretrained language model (PLM)

As shown in FIG. 1, in a training solution of the MLM, a training sample of the PLM is a text obtained after mask processing, that is, a sentence in which some words are replaced with special marker symbols (for example, [MASK]). For example, an original text is "Jin tian shi ging lang de zhou liu", and a text obtained after mask processing is "Jin [MASK] shi ging [MASK] de zhou liu". The text obtained after mask processing is input into the PLM, and the PLM needs to predict that to-be-masked words are "tian" and "lang". The training sample of the PLM may be referred to as a mask training sample. In a text (for example, a sentence), for a masked word, a word that is not masked is its context information. By predicting a to-to-masked word, the PLM learns a capability of capturing context information of the text. Therefore, the PLM trained according to the training solution of the MLM has a capability of understanding deep semantics of a natural language, and can be used for a series of NLP-related downstream tasks.

In the current training solution of the MLM, a word in each text is selected according to a random policy to perform mask processing in a fixed mask proportion, to obtain a mask training sample.

As described above, the training solution of the PLM is improved in two directions: first, improving a natural language understanding capability of the PLM; second, accelerating a model training speed (that is, accelerating a model convergence speed). Training the PLM by using the mask training sample obtained by using the existing training solution of the MLM may bring a bottleneck in the natural language understanding capability to the PLM. This is explained as follows.

In the current training solution of the MLM, a word in each text is selected according to a random policy to perform mask processing in a fixed mask proportion, to obtain a mask training sample. For example, the fixed mask proportion is denoted as r, and for each text, r×N words are randomly selected for mask processing, where N represents a quantity of words included in the text (if the text is considered as a sentence, N represents a length of the sentence). For example, assuming that a length of a sentence is N=100, when a mask proportion r=15%, 100×15%=15 words in the sentence are randomly selected and replaced with [MASK].

In the current training solution of the MLM, the mask training sample is obtained in the fixed mask proportion according to the random policy. As a result, a mode of the training sample of the PLM is simple, and a feature learned by the PLM is also fixed. Consequently, the PLM lacks a generalization capability, causing a bottleneck in the natural language understanding capability to the PLM obtained through training.

For the foregoing problem, embodiments of this disclosure provide a solution for generating a mask training sample of a PLM, to improve a natural language understanding capability of the PLM obtained through training. In other words, training the PLM by using the mask training sample obtained in embodiments of this disclosure can overcome the bottleneck in the natural language understanding capability of the PLM in the current technology.

Figure 2:
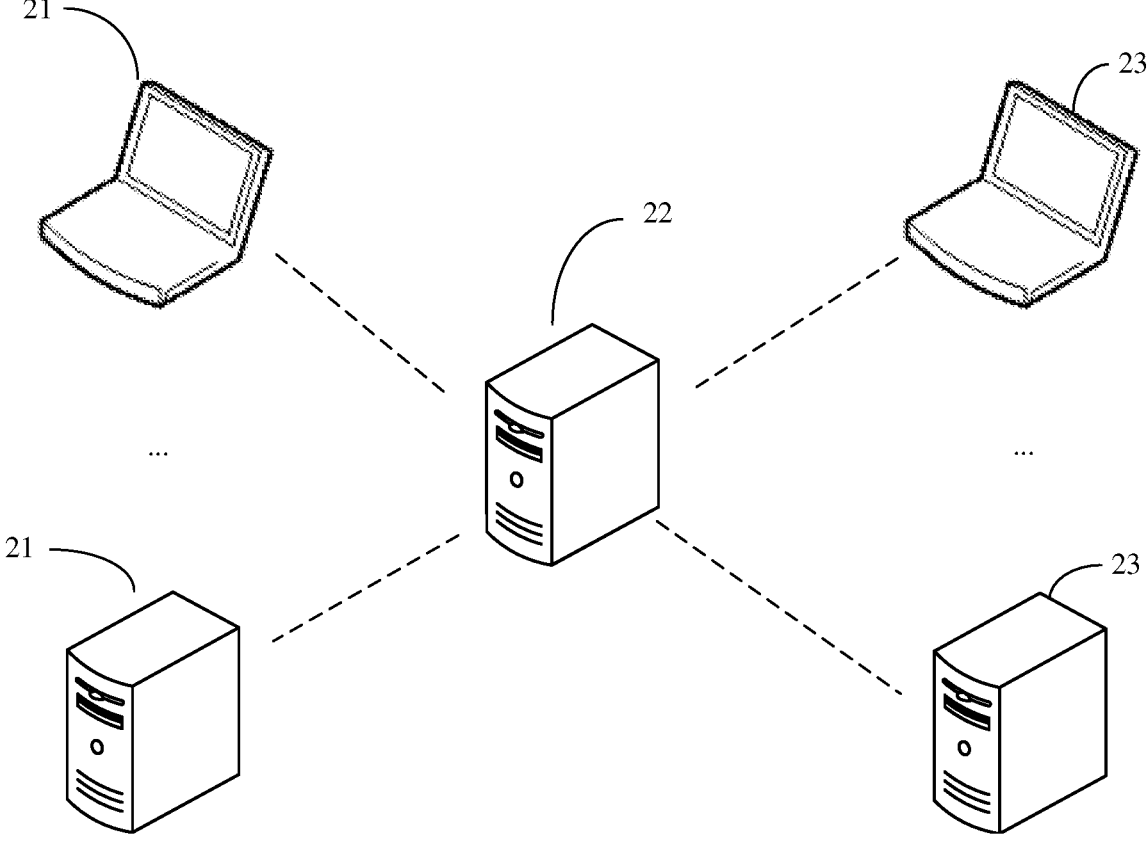
FIG. 2 is a schematic diagram of a system architecture to which an embodiment of this disclosure is applicable.

FIG. 2 is a schematic diagram of a system architecture to which an embodiment of this disclosure is applicable. The system may include a data collection device 21, a server device 22, and a client device 23. The data collection device 21, the server device 22, and the client device 23 are connected by using a communication network.

The data collection device 21 is configured to obtain an original text sample (for example, a large quantity of sentences), and transmit the original text sample to the server device 22.

The data collection device 21 may obtain the original text sample in a plurality of ways. For example, the original text sample is obtained in a manner such as manual input and/or network search.

The server device 22 is configured to obtain mask training data by using the solution provided in this embodiment of this disclosure, to obtain a trained PLM, and may output the PLM to the client device 23.

The client device 23 is configured to perform natural language understanding and processing by using the PLM obtained through training by the server device 22, for example, perform any one or more of the following NLP downstream tasks: sentiment analysis, part-of-speech analysis, intent analysis, named entity recognition, reading comprehension, logical reasoning, machine translation, conversational robot, or the like.

It should be noted that FIG. 2 is merely an example and not limitation.

For example, the data collection device 21 is optional. For example, an operation of the data collection device 21 may be performed on the server device 22.

For another example, the client device 23 is optional. For example, an operation of the client device 23 may be performed on the server device 22.

For ease of understanding and description, terms in this specification are explained as follows.

1. Original Text Sample

The original text sample represents a set of texts on which masking processing is to be performed. Each original text sample represents a text (or referred to as a text statement). For example, the original text sample is a set of a plurality of text sentences.

2. Mask Training Sample

The mask training sample represents a set of texts obtained after mask processing. Each mask training sample represents a text obtained after mask processing.

3. Mask Proportion

The mask proportion in this embodiment of this disclosure includes a text-level mask proportion and a word-level mask proportion.

The text-level mask proportion indicates a proportion of masked words in a text in all words in the text.

The text-level mask proportion may also be referred to as a sentence-level mask proportion or a sample-level mask proportion.

The word-level mask proportion indicates a probability that a word is masked. In a text, each word has a word-level mask proportion.

The expressions "a mask proportion of a mask training sample" and "a mask proportion of an original text sample" in this specification include a text-level mask proportion and/or a word-level mask proportion.

The word-level mask proportion may also be referred to as a mask probability of a word.

Figure 3:
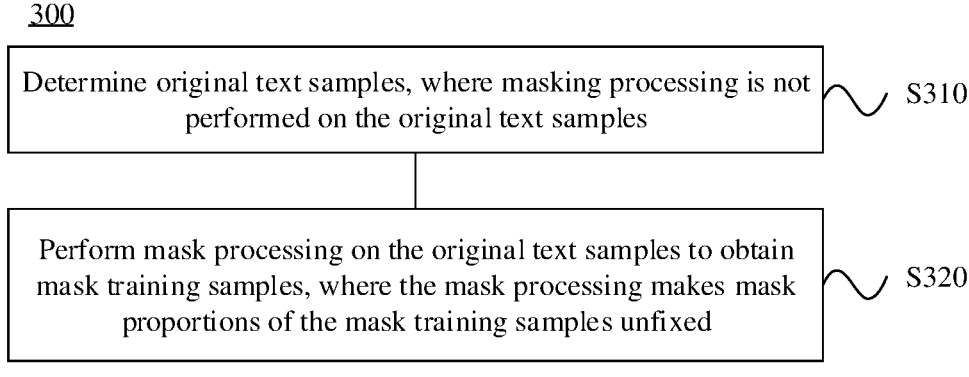
FIG. 3 is a schematic flowchart of a method for obtaining a mask training sample according to an embodiment of this disclosure.

FIG. 3 is a schematic flowchart of a data processing method 300 according to an embodiment of this disclosure. For example, the method 300 may be performed by the server device 22 in FIG. 2. The method 300 includes step S310 and step S320.

S310: Determine original text samples, where masking processing is not performed on the original text samples.

In an example, one of the original text samples is "Jin tian shi qing lang de zhou liu".

The original text sample may be obtained in a plurality of ways. For example, the original text sample is obtained in a manner such as manual input and/or network search.

S320: Perform mask processing on the original text samples to obtain mask training samples, where the mask processing makes mask proportions of the mask training samples unfixed. The mask training samples are used to train a PLM, and the PLM is used to predict to-be-masked words.

In an example, one of the original text samples is "Jin tian shi qing lang de zhou liu", and a corresponding training sample obtained after mask processing is performed on the sample is "Jin [MASK] shi qing [MASK] de zhou liu".

The mask proportions of the mask training samples include a text-level mask proportion and/or a word-level mask proportion.

For example, the mask proportion of the mask training sample is the text-level mask proportion.

In this example, if the mask proportions of the mask training samples are unfixed, it means that text-level mask proportions of different samples in the mask training samples are not exactly the same. Word-level mask proportions of different words in each sample may be the same, different, or not exactly the same.

For example, the mask training samples include a first sample and a second sample. A text-level mask proportion of the first sample is 15%, and a text-level mask proportion of the second sample is 20%. Assuming that both a total quantity of words included in the first sample and a total quantity of words included in the second sample are 100, 15 words in the first sample are masked, and 20 words in the second sample are masked.

For another example, the mask proportion of the mask training sample is the word-level mask proportion.

In this example, if the mask proportions of the mask training samples are unfixed, it means that word-level mask proportions of different words in each of the mask training samples are not exactly the same. Text-level mask proportions of different samples in the mask training samples may be the same, different, or not exactly the same.

For still another example, the mask proportions of the mask training samples include the text-level mask proportion and the word-level mask proportion.

In this example, if the mask proportions of the mask training samples are unfixed, it means that text-level mask proportions of different samples in the mask training samples are not exactly the same, and word-level mask proportions of different words in each of the mask training samples are not exactly the same.

For example, step S320 includes: obtaining a mask policy, where the mask policy can make the mask proportions of the original text samples unfixed; determining, according to the mask policy, whether each word in each of the original text samples needs to be masked, and if yes, replacing the word with a marker symbol (for example, [MASK]), or if no, performing no processing; and finally obtaining the mask training samples.

The mask policy may be obtained in a plurality of manners, which are described below and are not described in detail herein.

It should be understood that training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

It should be noted that step S310 is optional. For example, in an actual application, when the original text samples are known or ready, mask processing may be directly performed on the original text samples to obtain the mask training samples, that is, step S320 is directly performed without performing step S310.

In step 320, a plurality of implementations may be used to perform mask processing on the original text samples to obtain the mask training samples. In other words, the mask policy of the original text samples may be obtained in a plurality of manners.

Figure 4:
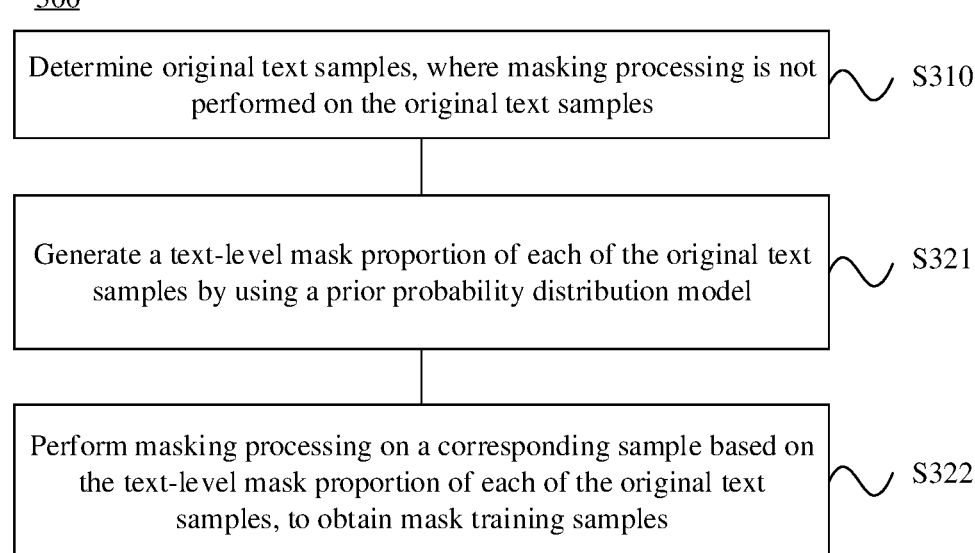
FIG. 4 is another schematic flowchart of a method for obtaining a mask training sample according to an embodiment of this disclosure.

Optionally, in an implementation, as shown in FIG. 4, step S320 includes step S321 and step S322.

S321: Generate a text-level mask proportion of each of the original text samples by using a prior probability distribution model, where the prior probability distribution model makes text-level mask proportions of different samples in the original text samples not exactly the same.

In other words, the prior probability distribution model is used to generate a mask proportion for each of the original text samples.

In an example, for an $i^{th}$ sample in the original text samples, a probability is generated by using the prior probability distribution model, and the probability is used as a text-level mask proportion of the $i^{th}$ sample, where i is 1, . . . , and M, and M represents a quantity of samples of the original text samples.

The probability generated by using the prior probability distribution model complies with probability distribution. Therefore, the mask proportion generated by using the prior probability distribution model dynamically changes instead of being fixed. In other words, text-level mask proportions of the original text samples generated by using the prior probability distribution model are not exactly the same. For example, text-level mask proportions of all samples are different, or text-level mask proportions of different samples in at least some samples are different.

In an example, the prior probability distribution model is denoted as P(r), r represents a probability, and a value range of r may be between 0% and 100%. In this case, a value range of a mask proportion generated by using P(r) is between 0% and 100%.

The probability distribution with which the prior probability distribution model complies may be any continuous or discrete probability distribution. For example, the probability distribution with which the prior probability distribution model complies is uniform distribution, Gaussian distribution, or the like. The Gaussian distribution may also be referred to as normal distribution.

Optionally, the probability distribution with which the prior probability distribution model complies is truncated Gaussian distribution (also referred to as truncated normal distribution).

A variable restriction range for the truncating Gaussian distribution may be set according to an application requirement.

S322: Perform masking processing on a corresponding sample based on the text-level mask proportion of each of the original text samples, to obtain the mask training samples.

In an example, assuming that mask proportions generated for a text sample 1 and a text sample 2 in the original text proportions are unfixed can enhance mode diversity of the training samples of the PLM. Therefore, features learned by the PLM are also diversified, and a natural language understanding capability of the PLM obtained through training can be improved.

Optionally, in the embodiment shown in FIG. 4, a probability value range length of the prior probability distribution model is not less than 40%.

For example, the probability value range of the prior probability distribution model is 0% to 40%.

A simulation experiment shows that the PLM obtained through training by using the mask training samples obtained in this embodiment has a capability of generating a natural language in a random order.

In an example, the PLM obtained through training by using the mask training samples obtained in this embodiment may generate the natural language in a random order shown in Table 1.

Generally, words of the natural language are generated from left to right in sequence. However, the PLM obtained through training by using the mask training samples obtained in this embodiment may specify coordinates of a next generated word each time, and a smooth text can still be generated in a random order.

TABLE 1

| Step | Prediction index | Sequence status | | | | | | | |
|------|------------------|------|------|------|----------|-----------|------|--------|-------|
| 0 | n/a | — | — | — | — | — | — | — | — |
| 1 | 3 | — | — | a | — | — | — | — | — |
| 2 | 7 | — | — | a | — | — | — | random | — |
| 3 | 1 | This | — | a | — | — | — | random | — |
| 4 | 2 | This | is | a | — | — | — | random | — |
| 5 | 4 | This | is | a | sentence | — | — | random | — |
| 6 | 6 | This | is | a | sentence | — | in | random | — |
| 7 | 5 | This | is | a | sentence | generated | in | random | — |
| 8 | 8 | This | is | a | sentence | generated | in | random | order | samples in step S321 are respectively r1 and r2, in step S322, mask processing is performed on the text sample 1 according to the mask proportion r1 to obtain a training sample (denoted as a training sample 1) corresponding to the text sample 1, and mask processing is performed on the text sample 2 according to the mask proportion r2 to obtain a training sample (denoted as a training sample 2) corresponding to the text sample 2. It may be understood that if r1 is different from r2, mask proportions of the training sample 1 and the training sample 2 are different.

In the foregoing example, assuming that a total quantity of words included in the text sample 1 is N1, an implementation of obtaining the training sample corresponding to the text sample 1 is: selecting, according to a random policy, r1×N1 words in the text sample 1 to perform mask processing in the mask proportion r1, to obtain the training sample corresponding to the text sample 1; or selecting, according to another feasible policy, r1×N1 words in the text sample 1 to perform masking processing, to obtain the training sample corresponding to the text sample 1. This is not limited in embodiments of this disclosure.

It should be understood that, in the embodiment shown in FIG. 4, the text-level mask proportions of the mask training samples are not exactly the same, in other words, the text-level mask proportions are unfixed.

In this embodiment of this disclosure, training the PLM by using the mask training samples whose text-level mask In Table 1, a generation sequence of words in a sequence "This is a sentence generated in random order" is 3→7→1→2→4→6→5→8.

Figure 5:
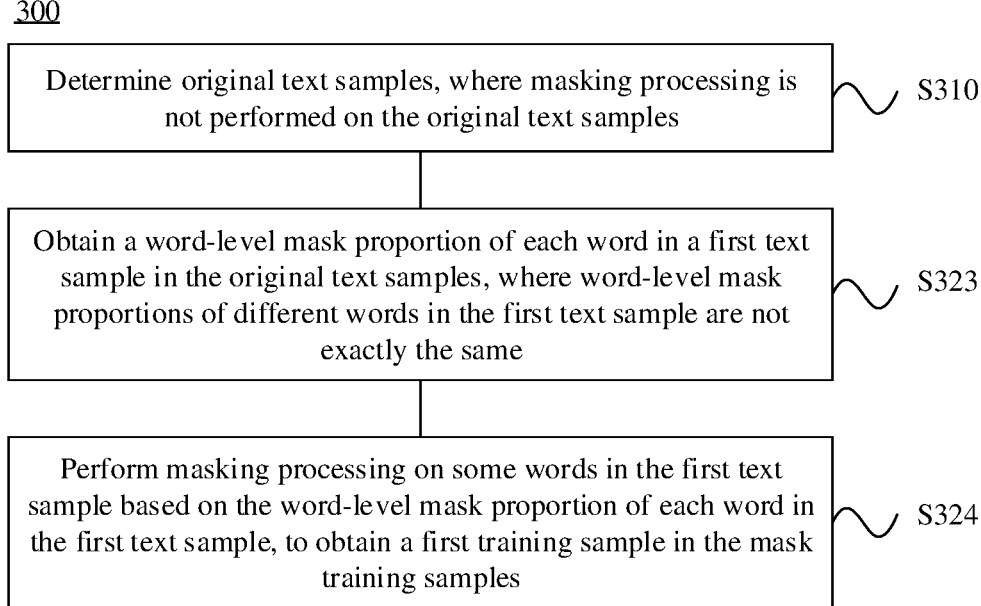
FIG. 5 is still another schematic flowchart of a method for obtaining a mask training sample according to an embodiment of this disclosure.

Optionally, in another implementation, as shown in FIG. 5, step S320 includes step S323 and step S324. A first training sample corresponding to a first text sample in the original text samples may be obtained by using step S323 and step S324.

For ease of description rather than limitation, in the embodiment shown in FIG. 5, the first text sample is used as an example to describe each of the original text samples. That is, the following description of the first text sample is applicable to each of the original text samples.

S323: Obtain a word-level mask proportion of each word in the first text sample in the original text samples, where word-level mask proportions of different words in the first text sample are not exactly the same.

If the word-level mask proportions of the different words in the first text sample are not exactly the same, it indicates that word-level mask proportions of at least two words in the first text sample are different.

Optionally, the word-level mask proportions of different words in the first text sample are all different.

Optionally, in the first text sample, word-level mask proportions of some words are different, and word-level mask proportions of some words are the same.

Figure 6:
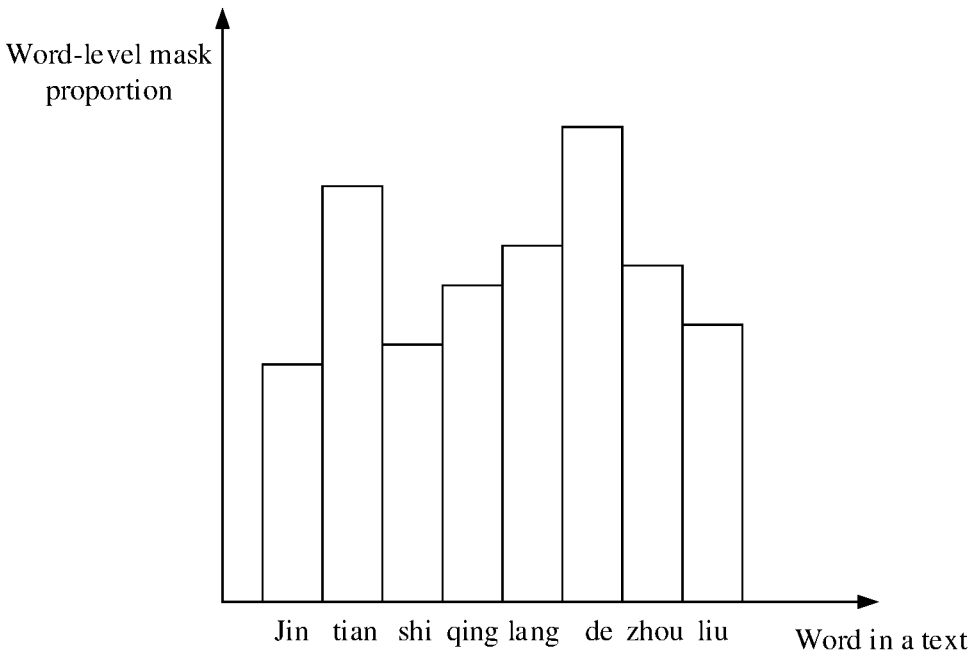
FIG. 6 is a schematic diagram of word-level mask proportions of words in an original text sample according to an embodiment of this disclosure.

In an example, assuming that the first text sample is "Jin tian shi qing lang de zhou liu", in step S323, a schematic distribution diagram of word-level mask proportions of words in the obtained "Jin tian shi qing lang de zhou liu" is shown in FIG. 6. In the example of FIG. 6, word-level mask proportions of all words in the first text sample are different.

A word-level mask proportion of a word indicates a probability that the word is masked.

S324: Perform masking processing on some words in the first text sample based on the word-level mask proportion of each word in the first text sample, to obtain the first training sample in the mask training samples.

The performing masking processing on some words in the first text sample refers to: performing masking processing on a word with a large mask proportion in the first text sample.

Based on the word-level mask proportion of each word in the first text sample, mask processing may be performed on the first text sample in a plurality of manners, to obtain the first training sample.

Optionally, in a manner, the step S324 includes: performing masking processing on first S words in the first text sample in descending order of the word-level mask proportions, to obtain the first training sample, where S is a positive integer whose value is less than a total quantity of words in the first text sample.

In an example, FIG. 6 is still used as an example. The first text sample is "Jin tian shi qing lang de zhou liu", and word-level mask proportions of words in the first text sample are shown in FIG. 6. Assuming that a value of S is 2, mask processing is performed on two words "lang" and "tian" with largest mask proportions in the first text sample, to obtain the first training sample "Jin [MASK] shi qing [MASK] de zhou liu".

Optionally, in another manner, step S324 includes: performing masking processing on first G % words in the first text sample in descending order of the word-level mask proportions to obtain the first training sample, where G is an integer greater than 0 and less than 100.

In an example, FIG. 6 is still used as an example. The first text sample is "Jin tian shi qing lang de zhou liu", and word-level mask proportions of words in the first text sample are shown in FIG. 6. Assuming that a value of G is 25, masking processing is performed on first 25% words in the first text sample, that is, "lang" and "tian", in descending order of the word-level mask proportions, to obtain the first training sample "Jin [MASK] shi qing [MASK] de zhou liu".

Optionally, in still another manner, step S324 includes: performing masking processing on a word whose mask proportion reaches D in the first text sample to obtain the first training sample, where D is a decimal greater than 0 and less than 1, and D is less than a word-level mask proportion of a word whose word-level mask proportion is the smallest in the first text sample.

If a word-level mask proportion of a word reaches D, it indicates that the word-level mask proportion of the word is greater than or equal to D.

In an example, FIG. 6 is still used as an example. The first text sample is "Jin tian shi qing lang de zhou liu", and word-level mask proportions of words in the first text sample are shown in FIG. 6. Assuming that only mask proportions of "lang" and "tian" each reaches D, mask processing is performed on "lang" and "tian", to obtain the first training sample "Jin [MASK] shi qing [MASK] de zhou liu".

It should be understood that, in the embodiment shown in FIG. 5, the word-level mask proportions of the mask training samples are not exactly the same, in other words, the word-level mask proportions of the words are unfixed.

As described above, in the current technology, a word in each text is selected according to a random policy to perform mask processing in a fixed mask proportion, to obtain a mask training sample. However, a randomly generated mask training sample may have a repeated feature. Training a PLM by using such a mask training sample may cause the PLM to repeatedly learn a same training sample in a training process, and therefore fast model convergence cannot be ensured.

In this embodiment of this disclosure, words in each of the original text samples have mask proportions that are not exactly the same, and during the mask processing of the original text samples, a mask policy is determined based on a word-level mask proportion of each word, instead of being determined according to a random policy, so that repeated features of the mask training samples can be reduced or avoided, and further the PLM can be prevented from repeatedly learning a same sample in a training process to some extent, and fast model convergence can be implemented.

In step S323, a plurality of implementations may be used to obtain a word-level mask proportion of each word in a first text sample in the original text samples, so that word-level mask proportions of different words in the first text sample are not exactly the same.

Optionally, in an implementation, the step S323 includes: generating a word-level mask proportion of each word in the first text sample by using a prior probability distribution model, where the prior probability distribution model makes word-level mask proportions of different words in the first text sample not exactly the same.

In other words, the prior probability distribution model is used to generate a mask proportion for each word in the first text sample. For example, for a $j^{th}$ word in the first text sample, a probability is generated by using the prior probability distribution model, and the probability is used as a word-level mask proportion of the $j^{th}$ word, where j is 1, . . . , and N1, and N indicates a total quantity of words included in the first text sample.

In an example, assuming that the first text sample is "Jin tian shi qing lang de zhou liu", in step S323, a schematic distribution diagram of word-level mask proportions of words in the "Jin tian shi qing lang de zhou liu" obtaining by using the prior probability distribution model is shown in FIG. 6.

It should be understood that a probability generated by using the prior probability distribution model complies with probability distribution. For example, a probability value range of the prior probability distribution model is between 0% and 100%. Therefore, the mask proportion generated by using the prior probability distribution model dynamically changes instead of being fixed.

In an example, the prior probability distribution model is denoted as P(r), r represents a probability, and a value range of r may be between 0% and 100%. In this case, a value range of a mask proportion generated by using P(r) is between 0% and 100%.

The prior probability distribution model mentioned herein is the same as the prior probability distribution model mentioned in step S321 above. For descriptions of the prior probability distribution model, refer to the foregoing descriptions. Details are not described herein again.

Optionally, in another implementation, the step S323 includes: inputting the first text sample into a neural network model, and obtaining the word-level mask proportion of each word in the first text sample from an output of the neural network model, where the output of the neural network model is a word-level mask proportion of each word in an input text. The neural network model is obtained through optimization learning, and a learning optimization process of the neural network model is shown in FIG. 7. In FIG. 7, an initial value of i is 1.

(1) Input an $i^{th}$ sample in the original text samples into the neural network model, and obtain a word-level mask proportion of each word in the $i^{th}$ sample from an output of the neural network model.

The obtaining the word-level mask proportion of each word in the $i^{th}$ sample from the output of the neural network model indicates that the word-level mask proportion of each word may be obtained based on an output signal of the neural network model for each word in the $i^{th}$ sample.

Figure 8:
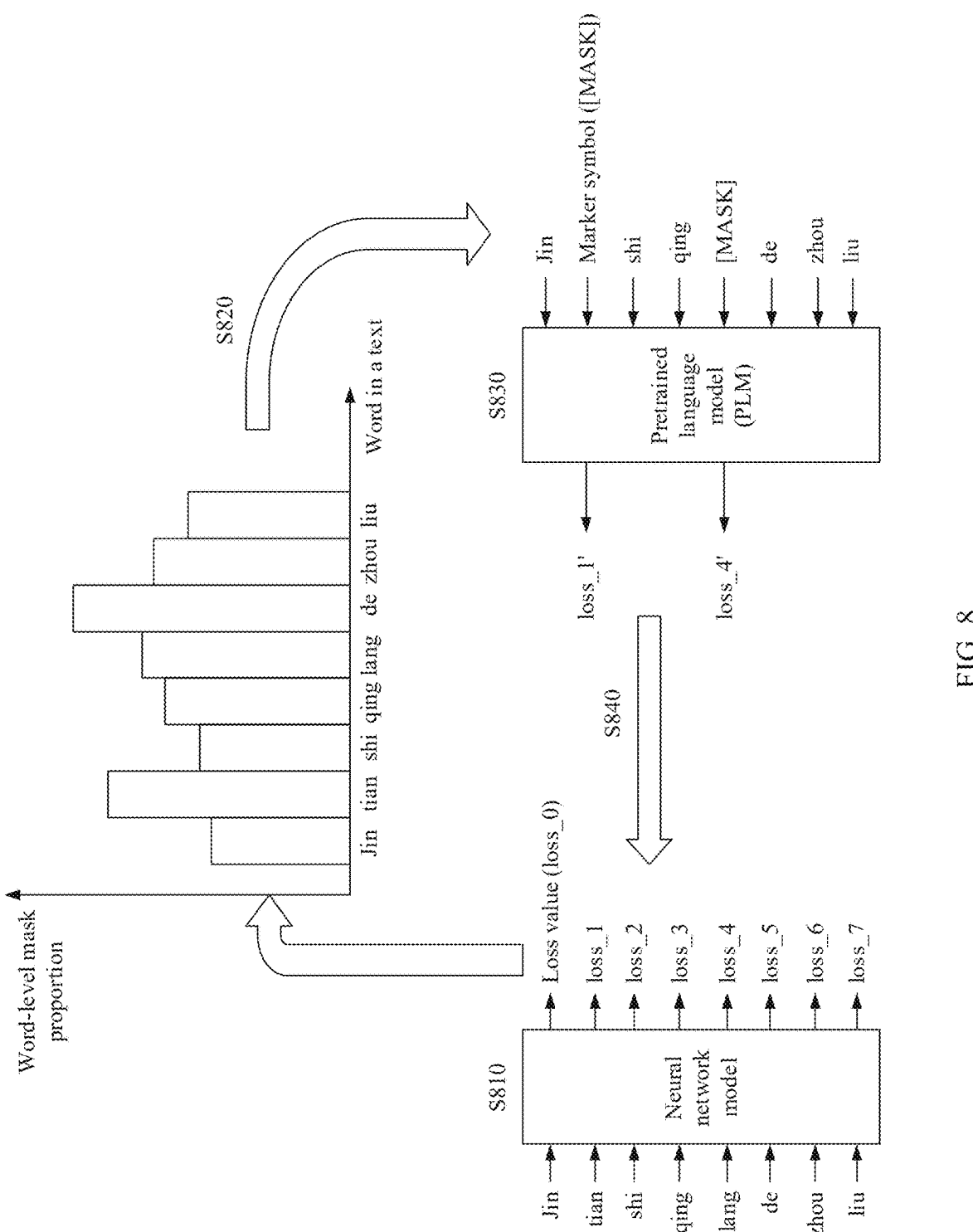
FIG. 8 is another schematic flowchart of optimization learning of a neural network model used to generate a word-level mask proportion of a word according to an embodiment of this disclosure.

For example, the neural network model may output a loss value (loss) for each word, and the loss value may be mapped to a mask proportion. As shown in FIG. 8, the neural network model may output a loss value for each word in the sample "Jin tian shi qing lang de zhou liu". For example, loss_0 indicates a loss value output by the neural network model for "Jin" in the sample. Meanings of loss_1 to loss_7 are similar, and details are not described herein again.

In this example, in a method for obtaining a mask probability of a word, a word-level mask proportion of the word is obtained based on a loss value output by the neural network model for the word and according to a mapping relationship between the loss value and the mask proportion.

In this example, the mapping relationship between the loss value output by the neural network model and the mask proportion may be designed according to an application requirement. This is not limited in this disclosure.

For another example, for each word, the neural network model may directly output a word-level mask proportion of the word.

In this example, the word-level mask proportion of each word may be obtained based on an output signal of the neural network model for each word in the $i^{th}$ sample.

(2) Perform masking processing on some words in the $i^{th}$ sample based on the word-level mask proportion of each word in the $i^{th}$ sample, to obtain a training sample corresponding to the $i^{th}$ sample.

Step (2) may correspond to step S324. For an implementation of performing mask processing on the $i^{th}$ sample based on the word-level mask proportion of each word in the $i^{th}$ sample, refer to the foregoing description. Details are not described herein again.

(3) Input the training sample corresponding to the $i^{th}$ sample into the PLM, to obtain loss values output by the PLM for masked words.

Because the loss value that is output by the PLM for the masked word and that is obtained in step (3) is used as a feedback signal of the neural network model, the loss value that is output by the PLM for the masked word and that is obtained in step (3) may be referred to as a feedback signal.

The PLM may predict, for input mask training data, a to-be-masked word on which mask processing is performed, and may further output a loss value (loss) of the masked word.

Optionally, the PLM may be a model with a fixed parameter. Details are described below and are not described herein again.

(4) Update and optimize a neural network model based on the loss values output by the PLM for the masked words and output signals of the neural network model for the masked words.

A first signal is obtained based on the loss value output by the PLM for the masked word, and a second signal is obtained based on the output signal of the neural network model for the masked word, where the first signal and the second signal are signals having a same meaning (that is, signals that can be compared). The neural network model is optimized and updated based on a difference between the first signal and the second signal.

Optionally, the loss value (denoted as an output signal 1) output by the PLM for the masked word and the output signal (denoted as an output signal 2) of the neural network model for the masked word are signals having a same meaning, and may be directly compared, and the neural network model may be directly optimized and updated based on a difference between the output signal 1 and the output signal 2.

For example, as shown in FIG. 8, the PLM outputs loss values loss_1' and loss_4' respectively for the masked words "tian" and "lang", and output signals of the neural network model for the masked words are also loss values (loss_1 and loss_4 shown in FIG. 8). In this case, the neural network model may be optimized and updated by comparing the loss values output by the PLM with the loss values output by the neural network model.

Optionally, the loss value (denoted as an output signal 1) output by the PLM for the masked word and the output signal (denoted as an output signal 2) of the neural network model for the masked word are signals not having a same meaning, that is, the signals cannot be compared. In this case, one of the output signal 1 and the output signal 2 may be processed as a signal having a same meaning as the other, and the signals can be compared.

In an example, an output signal of the neural network model for the masked word is a mask proportion, and there is a mapping relationship between the loss value output by the PLM for the masked word and the mask proportion. In this case, the loss value output by the PLM for the masked word may be first converted into the mask proportion according to the mapping relationship, and then the mask proportion is compared with the mask proportion output by the neural network model for the masked word, to optimize and update the neural network model.

A method for establishing the mapping relationship between the loss value and the mask proportion is not limited in this embodiment of this disclosure. For example, each loss value is divided by a same larger value (greater than all loss values), and an obtained proportion is used as a mask proportion mapped to each loss value.

(5) Determine whether the neural network model meets a convergence condition, and if yes, go to step (6); or if no, increase the value of i by 1, and go to step (1).

(6) Use the neural network model obtained in step (4) as the neural network model obtained through optimization learning.

In an example, assuming that one of the original text samples is "Jin tian shi ging lang de zhou liu", and a schematic flowchart of performing one optimization learning (one iteration process) on the neural network model by using the sample is shown in FIG. 8.

S810: Input the sample "Jin tian shi ging lang de zhou liu" into the neural network model, and obtain a word-level mask proportion of each word in the sample "Jin tian shi ging lang de zhou liu" from an output of the neural network model. S810 corresponds to step (1) in FIG. 7.

The obtaining the word-level mask proportion of each word in the sample "Jin tian shi ging lang de zhou liu" from the output of the neural network model indicates that the word-level mask proportion of each word may be obtained based on an output signal of the neural network model for each word in the sample.

As shown in FIG. 8, the neural network model outputs a loss value for each word in the sample "Jin tian shi ging lang de zhou liu". For example, loss_0 indicates a loss value output by the neural network model for "Jin" in the sample. Meanings of loss_1 to loss_7 are similar, and details are not described herein again. There is a mapping relationship between the loss value output by the neural network model for each word and the mask proportion. As shown in FIG. 8, loss_0 to loss_7 each are mapped to a mask proportion. In this case, a word-level mask proportion of each word may be obtained based on the loss value and according to the mapping relationship, and certainly, word-level mask proportions of masked words may be obtained.

S820: Mask words "tian" and "lang" whose mask proportions meet a condition in the sample "Jin tian shi ging lang de zhou liu" to obtain a corresponding training sample "Jin [MASK] shi ging [MASK] de zhou liu" corresponding to the sample "Jin tian shi ging lang de zhou liu". S820 corresponds to step (2) in FIG. 7.

S830: Input the mask training sample "Jin [MASK] shi ging [MASK] de zhou liu" into the PLM, obtain, from an output of the PLM, prediction results of the masked words in the mask training sample, and further obtain output signals of the PLM for the masked words (that is, "tian" and "lang"). S830 corresponds to step (3) in FIG. 7.

S840: Update and optimize the neural network model based on the output signals of the neural network model for the masked words (that is, "tian" and "lang") and loss values output by the PLM for the masked words. S840 corresponds to step (4) in FIG. 7.

Optionally, in the embodiment shown in FIG. 7, the PLM is a model in which a parameter is updated in real time based on the mask training sample.

For example, step (3) includes: performing one training update on the PLM by using the training sample corresponding to the $i^{th}$ sample; and inputting the training sample corresponding to the $i^{th}$ sample into the training updated PLM, to obtain loss values output by the training updated PLM for the masked words.

The performing one training update on the PLM by using the training sample corresponding to the $i^{th}$ sample indicates that the PLM is trained once by using the training sample corresponding to the $i^{th}$ sample, so that a parameter of the PLM is updated.

The step (4) includes: updating and optimizing the neural network model based on the loss values output by the training updated PLM for the masked words and output signals of the neural network model for the masked words.

The PLM is trained and updated when optimization learning is performed on the word-level mask proportion used to generate the word, so that a better mask training sample can be further generated. Training the PLM by using such a mask training sample can implement model fast convergence of the PLM and improve a natural language understanding capability of the PLM.

It should be understood that, in the embodiment shown in FIG. 7 or FIG. 8, the implementing optimization learning of the neural network model is equivalent to implementing optimization learning of the mask policy.

In this embodiment of this disclosure, the generating the word-level mask proportion of each word in each of the original text samples by using the neural network model obtained through optimization learning is equivalent to performing optimization learning on the mask policy, so that a better mask training sample can be generated. Therefore, training the PLM by using such a mask training sample can implement fast model convergence of the PLM and improve a natural language understanding capability of the PLM.

Compared with the embodiment shown in FIG. 7 or FIG. 8 in which the mask policy is obtained by using the neural network model obtained through optimization learning, the foregoing embodiment in which the mask policy is obtained based on the probability distribution model may be considered as obtaining the mask policy based on a preset model (or according to experience).

In this embodiment of this disclosure, generation of the mask training sample may be controlled in a specific manner. For example, generation of a mask training sample is controlled by controlling a mask proportion (that is, a text-level mask proportion) of a text (that is, a sentence). For another example, generation of a mask training sample is controlled by controlling a word-level mask proportion of a word in a text. Therefore, in this embodiment of this disclosure, the mask training sample may be generated in a control manner instead of being randomly generated, so that a natural language understanding capability of the PLM and a PLM convergence speed can be improved by controlling the mask training sample.

The solution for obtaining the mask training sample of the PLM provided in this embodiment of this disclosure may be applied to all MLM-based PLMs.

As shown in FIG. 9, an embodiment of this disclosure further provides a PLM training method 900. For example, the method 900 may be performed by the server device 22 in FIG. 2. The method 900 includes step S910 and step S920.

S910: Obtain mask training samples by using the method 300 in the foregoing embodiment.

S920: Train a pretrained language model PLM by using the mask training samples, where the PLM is used to predict to-be-masked words.

In this embodiment of this disclosure, training the PLM by using the mask training samples whose mask proportions are unfixed can enhance mode diversity of the training samples of the PLM. Therefore, features learned by the PLM are also diversified, a generalization capability of the PLM can be improved, and a natural language understanding capability of the PLM obtained through training can be improved.

Further, words in each of the original text samples have mask proportions that are not exactly the same, and during the mask processing of the original text samples, a mask policy is determined based on a word-level mask proportion of each word, instead of being determined according to a random policy, so that repeated features of the mask training samples can be reduced or avoided, and further the PLM can be prevented from repeatedly learning a same sample in a training process to some extent, and fast model convergence can be implemented.

Further, in a mask processing process of the original text samples, a word-level mask proportion of each word in each of the original text samples is generated by using the neural network model obtained through optimization learning, and then a mask policy is determined based on the word-level mask proportion of each word, so that a better mask training sample can be generated. Therefore, training the PLM by using such a mask training sample can implement fast model convergence of the PLM and improve a natural language understanding capability of the PLM.

The training solution of the PLM provided in this embodiment of this disclosure may be applied to all MLM-based PLMs.

As shown in FIG. 10, an embodiment of this disclosure further provides a data processing method 1000. For example, the method 1000 may be performed by the server device 22 or the client device 23 in FIG. 2. The method 1000 includes step S1010 and step S1020.

S1010: Determine a to-be-predicted target text, where the target text includes a statement lacking some words.

If the target text includes the statement lacking some words, it may alternatively be expressed as: the target text includes a statement lacking context information.

S1020: Input the target text into a PLM, and predict, from an output of the PLM, words missing in the target text, where the PLM is the PLM obtained through training by using the method 900 provided in the foregoing embodiment.

Experimental simulation shows that the PLM obtained through training by using the solution provided in this embodiment of this disclosure has a significant improvement effect on a related downstream task of natural language understanding.

In an example, Table 2 shows that the PLM (denoted as u-PMLM-A) obtained through training by using the solution provided in this embodiment of this disclosure has a higher score compared with an existing BERT(A) model.

TABLE 2

| Model | COLA | SST2 | MRPC | STSB | QQP | MNLI-m/mm | QNLI | RTE | AX | AVG. |
|-------|------|------|------|------|-----|-----------|------|-----|-----|------|
| BERT(A) | 52.1 | 93.5 | 88.9/84.8 | 87.1/85.8 | 71.2/89.2 | 84.6/83.4 | 90.5 | 66.4 | 34.2 | 78.3 |
| u-PMLM-A | 56.5 | 94.3 | 88.8/84.4 | 87.0/85.9 | 71.4/89.2 | 84.5/83.5 | 91.8 | 66.1 | 37.0 | 79.0 |

COLA, SST2, MRPC, STSB, QQP, MNL1-m/mm, QNLI, RTE and AX in the horizontal table header of Table 2 each represent a name of a subtask in a natural language processing task set (GLUE), and AVG. represents an average score of these subtasks.

Embodiments described in this specification may be independent solutions, or may be combined based on internal logic. All these solutions fall within the protection scope of this disclosure.

The foregoing describes method embodiments provided in this disclosure, and the following describes apparatus embodiments provided in this disclosure. It should be understood that descriptions of apparatus embodiments correspond to the descriptions of method embodiments. Therefore, for content that is not described in detail, refer to the foregoing method embodiments. For brevity, details are not described herein again.

FIG. 11 is a schematic block diagram of a data processing apparatus 1100 according to an embodiment of this disclosure. The apparatus 1100 includes a mask generation module 1110 and a PLM model training module 1120.

The mask generation module 1110 is configured to perform mask processing on original text samples by using the method 300 provided in this embodiment of this disclosure, to obtain mask training data.

For example, in some embodiments, the mask generation module 1110 includes the neural network model shown in FIG. 8.

The PLM model training module 1120 is configured to perform PLM model training by using the mask training data obtained by the mask generation module 1110.

Figure 12:
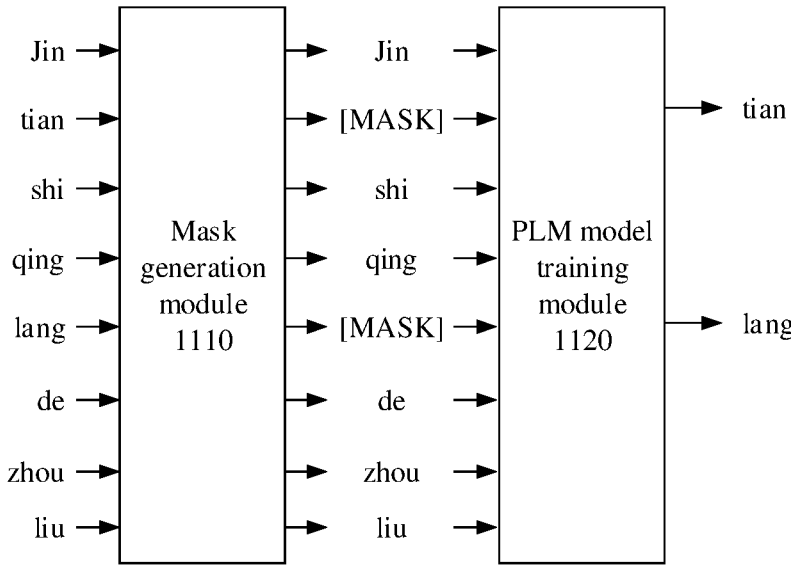
FIG. 12 is a schematic diagram of an application of the apparatus shown in FIG. 11.

In an example, as shown in FIG. 12, a text sample "Jin tian shi ging lang de zhou liu" is input into the mask generation module 1110, and the mask generation module 1110 outputs a training sample "Jin [MASK] shi ging [MASK] de zhou liu". The training sample "Jin [MASK] shi ging [MASK] de zhou liu" is input into the PLM model training module 1120, and the PLM model training module 1120 outputs prediction results of masked words of "tian" and "lang".

Figure 13:
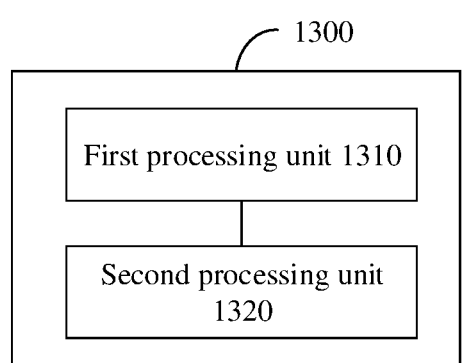
FIG. 13 is another schematic block diagram of a data processing apparatus according to an embodiment of this disclosure.

As shown in FIG. 13, an embodiment of this disclosure further provides a data processing apparatus 1300. The apparatus 1300 is configured to perform the foregoing method embodiment. The apparatus 1300 includes a first processing unit 1310 and a second processing unit 1320.

Optionally, in a first design, the apparatus 1300 is configured to perform the method 300 in the foregoing method embodiment. The first processing unit 1310 is configured to determine original text samples, where masking processing is not performed on the original text samples. The second processing unit 1320 is configured to perform mask processing on the original text samples to obtain mask training samples, where the mask processing makes mask proportions of the mask training samples unfixed, and the mask training samples each are used to train a PLM.

The mask proportions of the mask training samples include a text-level mask proportion and/or a word-level mask proportion. For details, refer to the foregoing description.

Details are not described herein again.

Optionally, the second processing unit 1320 is configured to: generate a text-level mask proportion of each of the original text samples by using a prior probability distribution model, where the prior probability distribution model makes text-level mask proportions of different samples in the original text samples not exactly the same; and perform masking processing on a corresponding sample based on the text-level mask proportion of each of the original text samples, to obtain the mask training samples.

Optionally, a probability value range length of the prior probability distribution model is not less than 40%.

Optionally, the second processing unit 1320 is configured to: obtain a word-level mask proportion of each word in a first text sample in the original text samples, where word-level mask proportions of different words in the first text sample are not exactly the same; and perform masking processing on some words in the first text sample based on the word-level mask proportion of each word in the first text sample, to obtain a first training sample in the mask training samples.

Optionally, the second processing unit 1320 is configured to generate a word-level mask proportion of each word in the first text sample by using a prior probability distribution model, where the prior probability distribution model makes word-level mask proportions of different words in the first text sample not exactly the same.

Optionally, the second processing unit 1320 is configured to input the first text sample into a neural network model, and obtain the word-level mask proportion of each word in the first text sample from an output of the neural network model, where the output of the neural network model is a word-level mask proportion of each word in an input text. The neural network model is obtained through optimization learning by using the steps shown in FIG. 7, and an initial value of i is 1. For details, refer to the foregoing description. Details are not described herein again.

Optionally, the second processing unit 1320 is configured to perform masking processing on first S words or first G % words in the first text sample in descending order of the word-level mask proportions, to obtain the first training sample, where S is a positive integer whose value is less than a total quantity of words in the first text sample, and G is an integer greater than 0 and less than 100.

The apparatus 1300 in the first design may be disposed in the mask generation module 1110 in the apparatus 1100.

In some embodiments, the mask generation module 1110 in the apparatus 1100 includes the apparatus 1300 in the first design.

Optionally, in a second design, the apparatus 1300 is configured to perform the method 900 in the foregoing method embodiment. The first processing unit 1310 is configured to obtain mask training samples by using the method 300 in the foregoing method embodiment; and the second processing unit 1320 is configured to train a pre-trained language model PLM by using the mask training samples, where the PLM is used to predict to-be-masked words.

The apparatus 1300 in the second design may be disposed in the PLM model training module 1120 in the apparatus 1100.

In some embodiments, the PLM model training module 1120 in the apparatus 1100 includes the apparatus 1300 in the second design.

Optionally, in a third design, the apparatus 1300 is configured to perform the method 1000 in the foregoing method embodiment. The first processing unit 1310 is configured to determine a to-be-predicted target text, where the target text includes a statement lacking some words; and the second processing unit 1320 is configured to input the target text into a pretrained language model PLM, and predict, from an output of the PLM, words missing in the target text, where the PLM is obtained through training by using the method 900 in the foregoing method embodiment.

It should be understood that the first processing unit 1310 and the second processing unit 1320 may be implemented by using a processor.

Figure 14:
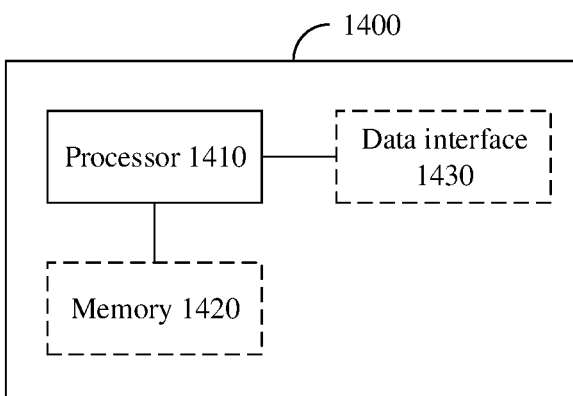
FIG. 14 is still another schematic block diagram of a data processing apparatus according to an embodiment of this disclosure.

As shown in FIG. 14, an embodiment of this disclosure further provides a data processing apparatus 1400. The apparatus 1400 includes a processor 1410. The processor 1410 is coupled to a memory 1420. The memory 1420 is configured to store a computer program or instructions. The processor 1410 is configured to execute the computer program or the instructions stored in the memory 1420, so that the method in the foregoing method embodiment is performed.

Optionally, as shown in FIG. 14, the apparatus 1400 may further include the memory 1420.

Optionally, as shown in FIG. 14, the apparatus 1400 may further include a data interface 1430. The data interface 1430 is configured to transmit data to the outside.

Optionally, in a solution, the apparatus 1400 is configured to implement the method 300 in the foregoing embodiment.

Optionally, in another solution, the apparatus 1400 is configured to implement the method 900 in the foregoing embodiment.

Optionally, in still another solution, the apparatus 1400 is configured to implement the method 1000 in the foregoing embodiment.

An embodiment of this disclosure further provides a computer-readable medium. The computer-readable medium stores program code to be executed by a device, and the program code is used to perform the methods in the foregoing embodiments.

An embodiment of this disclosure further provides a computer program product including instructions. When the computer program product is run on a computer, the computer is enabled to perform the methods in the foregoing embodiments.

An embodiment of this disclosure further provides a chip, and the chip includes a processor and a data interface. The processor reads, through the data interface, instructions stored in a memory to perform the methods in the foregoing embodiments.

Optionally, in an implementation, the chip may further include a memory, the memory stores instructions, the processor is configured to execute the instructions stored in the memory, and when the instructions are executed, the processor is configured to perform the method in the foregoing embodiment.

An embodiment of this disclosure further provides an electronic device. The electronic device includes the apparatus 1100 in the foregoing embodiment.

An embodiment of this disclosure further provides an electronic device. The electronic device includes the apparatus 1300 in the first design, the apparatus 1300 in the second design, or the apparatus 1300 in the third design.

An embodiment of this disclosure further provides an electronic device. The electronic device includes the apparatus 1300 in the first design and the apparatus 1300 in the second design.

Figure 15:
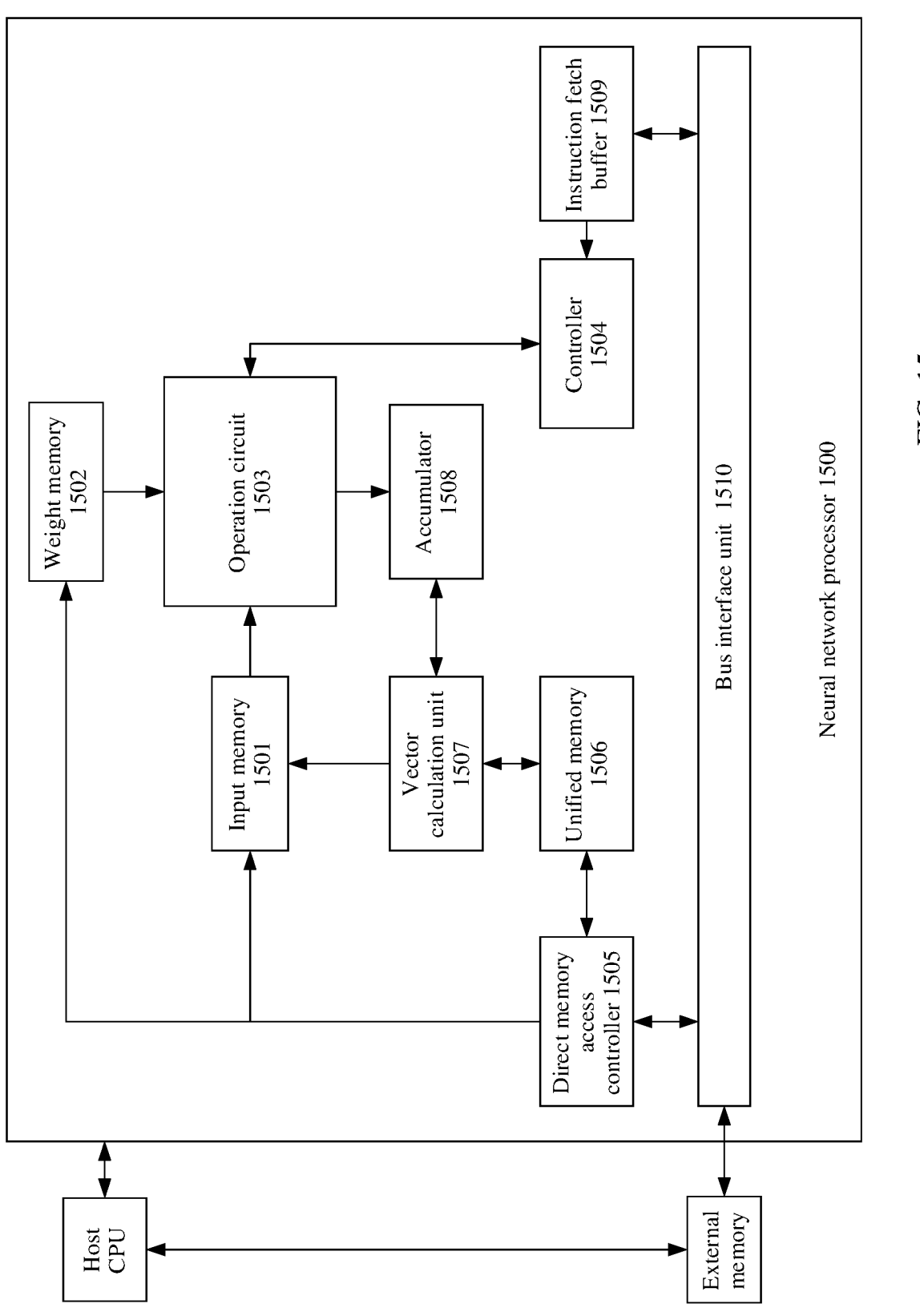
FIG. 15 is a schematic diagram of a hardware structure of a chip according to an embodiment of this disclosure.

FIG. 15 is a hardware structure of a chip according to an embodiment of this disclosure. The chip includes a neural network processor 1500. The chip may be disposed in any one or more of the following apparatuses:

the apparatus 1100 shown in FIG. 13, the apparatus 1300 shown in FIG. 13, and the apparatus 1400 shown in FIG. 14.

The method 300, 900, or 1000 in the foregoing method embodiments may be implemented in the chip shown in FIG. 15.

The neural network processor 1500, as a coprocessor, is mounted to a host CPU, and the host CPU assigns a task. A core part of the neural network processor 1500 is an operation circuit 1503. A controller 1504 controls the operation circuit 1503 to obtain data from a memory (a weight memory 1502 or an input memory 1501) and perform an operation.

In some implementations, the operation circuit 1503 internally includes a plurality of processing units (PE). In some implementations, the operation circuit 1503 is a two-dimensional systolic array. The operation circuit 1503 may alternatively be a one-dimensional systolic array or another electronic circuit capable of performing mathematical operations such as multiplication and addition. In some implementations, the operation circuit 1503 is a general-purpose matrix processor.

For example, it is assumed that there is an input matrix A, a weight matrix B, and an output matrix C. The operation circuit 1503 obtains data corresponding to the matrix B from the weight memory 1502, and caches the data on each PE in the operation circuit 1503. The operation circuit 1503 obtains data of the matrix A from the input memory 1501 to perform a matrix operation on the matrix B, and stores an obtained partial result or an obtained final result of the matrix into an accumulator 1508.

A vector calculation unit 1507 may perform further processing such as vector multiplication, vector addition, an exponent operation, a logarithm operation, or value comparison on an output of the operation circuit 1503. For example, the vector calculation unit 1507 may be configured to perform network calculation, such as pooling, batch normalization, or local response normalization at a non-convolutional/non-FC layer in a neural network.

In some implementations, the vector calculation unit 1507 may store a processed output vector in a unified memory (or may be referred to as a unified buffer) 1506. For example, the vector calculation unit 1507 may apply a non-linear function to an output of the operation circuit 1503, for example, to a vector of an accumulated value, to generate an activation value. In some implementations, the vector calculation unit 1507 generates a normalized value, a combined value, or both a normalized value and a combined value. In some implementations, the processed output vector can be used as an activation input to the operation circuit 1503, for example, to be used in a subsequent layer in the neural network.

The method 300, 500, or 600 in the foregoing method embodiments may be performed by 1503 or 1507.

The unified memory 1506 is configured to store input data and output data.

For weight data, a direct memory access controller (DMAC) 1505 directly transfers input data in an external memory to the input memory 1501 and/or the unified memory 1506, stores weight data in the external memory in the weight memory 1502, and stores data in the unified memory 1506 in the external memory.

A bus interface unit (BIU) 1510 is configured to implement interaction between the host CPU, the DMAC, and an instruction fetch buffer 1509 by using the bus.

The instruction fetch buffer 1509 connected to the controller 1504, configured to store instructions used by the controller 1504.

The controller 1504 is configured to invoke the instructions cached in the instruction fetch buffer 1509, to control a working process of the operation accelerator.

When the chip shown in FIG. 15 is configured to perform the method 300 in the foregoing method embodiment, the data herein may be the original text sample.

When the chip shown in FIG. 15 is configured to perform the method 900 in the foregoing method embodiment, the data herein may be the mask training sample.

When the chip shown in FIG. 15 is configured to perform the method 1000 in the foregoing method embodiment, the data herein may be the to-be-predicted target text.

Usually, the unified memory 1506, the input memory 1501, the weight memory 1502, and the instruction fetch buffer 1509 each are an on-chip memory. The external memory is a memory outside the NPU. The external memory may be a double data rate synchronous dynamic random access memory (DDR SDRAM), a high bandwidth memory (HBM), or another readable and writable memory.

Unless otherwise defined, all technical and scientific terms used in this specification have same meanings as that usually understood by a person skilled in the art of this disclosure. The terms used in the specification of this disclosure are merely for the purpose of describing specific embodiments, and are not intended to limit this disclosure.

It should be noted that various numerals such as first, second, third, or fourth in this specification are merely used for differentiation for ease of description, and are not used to limit the scope of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a universal serial bus flash disk (UFD) (UFD may also be referred to as a USB flash drive or a flash memory), a removable hard disk, a read-only memory (ROM), a random access memory (RAM), a magnetic disk, or a compact disc. The UFD may also be briefly referred to as a USB flash drive or a USB flash drive.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data processing method comprising:

determining original text samples, wherein masking processing has not been previously performed on the original text samples;

performing the mask processing on the original text samples to obtain mask training samples, wherein the mask processing makes mask proportions of the mask training samples unfixed; and training a pretrained language model (PLM) using the mask training samples;

wherein the performing of the mask processing on the original text samples to obtain the mask training samples comprises:

obtaining a word-level mask proportion of each word in a first text sample in the original text samples, wherein word-level mask proportions of different words in the first text sample are not exactly the same; and performing masking processing on some words in the first text sample based on the word-level mask proportion of each word in the first text sample, to obtain a first training sample in the mask training samples;

wherein the obtaining of the word-level mask proportion of each word in the first text sample in the original text samples comprises:

inputting the first text sample into a neural network model, and obtaining the word-level mask proportion of each word in the first text sample from an output of the neural network model, wherein the neural network model is obtained through optimization learning by using the following steps, and an initial value of i is 1:

(a) input a training sample corresponding to an ith sample in the original text samples into the PLM, to obtain loss values of the PLM for masked words; and (b) update and optimize a neural network model based on the loss values output by the PLM for the masked words and output signals of the neural network model for the masked words.

2. The method according to claim 1, wherein the performing of the mask processing on the original text samples to obtain the mask training samples comprises:

generating a text-level mask proportion of each of the original text samples by using a prior probability distribution model, wherein the prior probability distribution model makes text-level mask proportions of different samples in the original text samples not exactly the same; and performing masking processing on a corresponding sample based on the text-level mask proportion of each of the original text samples, to obtain the mask training samples.

3. The method according to claim 1, wherein the obtaining of the word-level mask proportion of each word in the first text sample in the original text samples further comprises:

generating the word-level mask proportion of each word in the first text sample by using a prior probability distribution model, wherein the prior probability distribution model makes the word-level mask proportions of different words in the first text sample not exactly the same.

4. The method according to claim 1, wherein the obtaining of the word-level mask proportion of each word in the first text sample in the original text samples further comprises:

(c) input the ith sample in the original text samples into the neural network model, and obtain the word-level mask proportion of each word in the ith sample from the output of the neural network model;

(d) perform masking processing on some words in the ith sample based on the word-level mask proportion of each word in the ith sample, to obtain the training sample corresponding to the ith sample;

(e) determine whether the neural network model meets a convergence condition, and if yes, go to step (f); or if no, increase the value of i by 1, and go to step (c); and (f) use the neural network model obtained in step (b) as the neural network model obtained through optimization learning.

5. The method according to claim 4, wherein step (a) comprises:

performing one training update on the PLM by using the training sample corresponding to the ith sample; and inputting the training sample corresponding to the ith sample into the training updated PLM, to obtain the loss values output by the training updated PLM for the masked words, wherein the step (b) comprises: updating and optimizing the neural network model based on the loss values output by the training updated PLM for the masked words and the output signals of the neural network model for the masked words.

6. The method according to claim 1, further comprising:

determining a to-be-predicted target text, wherein the target text comprises a statement lacking some words; and inputting the target text into the PLM, and predicting, from an output of the PLM, words missing in the target text, wherein the PLM is trained by the mask training samples.

7. A data processing apparatus comprising:

at least one processor configured to execute a computer program stored in a memory such that the data processing apparatus is configured to:

determine original text samples, wherein masking processing has not been previously performed on the original text samples;

perform mask processing on the original text samples to obtain mask training samples, wherein the mask processing makes mask proportions of the mask training samples unfixed; and train a pretrained language model (PLM) using the mask training samples;

wherein the data processing apparatus is further configured to:

obtain a word-level mask proportion of each word in a first text sample in the original text samples, wherein word-level mask proportions of different words in the first text sample are not exactly the same; and perform masking processing on some words in the first text sample based on the word-level mask proportion of each word in the first text sample, to obtain a first training sample in the mask training samples;

wherein the data processing apparatus is further configured to input the first text sample into a neural network model, and obtain the word-level mask proportion of each word in the first text sample from an output of the neural network model, wherein the neural network model is obtained through optimization learning by using the following steps, and an initial value of i is 1:

(a) input a training sample corresponding to an ith sample in the original text samples into the PLM, to obtain loss values output by the PLM for masked words; and (b) update and optimize a neural network model based on the loss values output by the PLM for the masked words and output signals of the neural network model for the masked words.

8. The data processing apparatus according to claim 7, wherein the data processing apparatus is further configured to:

generate a text-level mask proportion of each of the original text samples by using a prior probability distribution model, wherein the prior probability distribution model makes text-level mask proportions of different samples in the original text samples not exactly the same; and perform masking processing on a corresponding sample based on the text-level mask proportion of each of the original text samples, to obtain the mask training samples.

9. The data processing apparatus according to claim 7, wherein the data processing apparatus is further configured to generate the word-level mask proportion of each word in the first text sample by using a prior probability distribution model, wherein the prior probability distribution model makes the word-level mask proportions of different words in the first text sample not exactly the same.

10. The data processing apparatus according to claim 7, wherein the data processing apparatus is further configured to:

(c) input the ith sample in the original text samples into the neural network model, and obtain the word-level mask proportion of each word in the ith sample from the output of the neural network model;

(d) perform masking processing on some words in the ith sample based on the word-level mask proportion of each word in the ith sample, to obtain the training sample corresponding to the ith sample;

(e) determine whether the neural network model meets a convergence condition, and if yes, go to step (f); or if no, increase the value of i by 1, and go to step (c); and (f) use the neural network model obtained in step (b) as the neural network model obtained through optimization learning.

11. The data processing apparatus according to claim 7, wherein the data processing apparatus is further configured to:

determine a to-be-predicted target text, wherein the target text comprises a statement lacking some words; and input the target text into the PLM, and predict, from an output of the PLM, words missing in the target text, wherein the PLM is trained by the mask training samples.

12. A chip comprising at least one processor and a data interface, wherein the at least one processor is configured to invoke and run, through the data interface, a computer program stored in a memory, to enable the chip to at least be configured to:

determine original text samples, wherein masking processing has not been previously performed on the original text samples;

perform mask processing on the original text samples to obtain mask training samples, wherein the mask processing makes mask proportions of the mask training samples unfixed; and train a pretrained language model (PLM) using the mask training samples;

wherein the chip is configured to perform the mask processing on the original text samples to obtain the mask training samples by being configured to:

obtain a word-level mask proportion of each word in a first text sample in the original text samples, wherein word-level mask proportions of different words in the first text sample are not exactly the same; and perform masking processing on some words in the first text sample based on the word-level mask proportion of each word in the first text sample, to obtain a first training sample in the mask training samples; and wherein the chip is configured to obtain the word-level mask proportion of each word in a first text sample in the original text samples by being configured to:

input the first text sample into a neural network model, and obtaining the word-level mask proportion of each word in the first text sample from an output of the neural network model, wherein the neural network model is obtained through optimization learning by using the following steps, and an initial value of i is 1:

(a) input a training sample corresponding to an ith sample in the original text samples into the PLM, to obtain loss values of the PLM for masked words; and (b) update and optimize a neural network model based on the loss values output by the PLM for the masked words and output signals of the neural network model for the masked words.

13. The chip according to claim 12, wherein the chip is configured to obtain the word-level mask proportion of each word in a first text sample in the original text samples by being further configured to:

(c) input the ith sample in the original text samples into the neural network model, and obtain the word-level mask proportion of each word in the ith sample from the output of the neural network model;

(d) perform masking processing on some words in the ith sample based on the word-level mask proportion of each word in the ith sample, to obtain the training sample corresponding to the ith sample;

(e) determine whether the neural network model meets a convergence condition, and if yes, go to step (f); or if no, increase the value of i by 1, and go to step (c); and (f) use the neural network model obtained in step (b) as the neural network model obtained through optimization learning.

14. The chip according to claim 12, wherein the chip is further configured to:

determine a to-be-predicted target text, wherein the target text comprises a statement lacking some words; and input the target text into the PLM, and predicting, from an output of the PLM, words missing in the target text, wherein the PLM is trained by the mask training samples.

15. The chip according to claim 12, wherein the chip is further configured to use the PLM to perform a task involving natural language processing, the task including one or more of: speech analysis, machine translation or conversational robot.

16. The method according to claim 1, further comprising using the PLM to perform a task involving natural language processing, the task including one or more of: speech analysis, machine translation or conversational robot.

17. The data processing apparatus according to claim 7, wherein the data processing apparatus is further configured to use the PLM to perform a task involving natural language processing, the task including one or more of: speech analysis, machine translation or conversational robot.

18. The method according to claim 1, wherein the mask proportions of the mask training samples that are unfixed comprise:

text-level mask proportions of different samples in the mask training samples that are not exactly the same, wherein the text-level mask proportions are used to indicate a proportion of masked words in a sample in all words in the sample; and/or word-level mask proportions of words in any of the mask training samples that are not exactly the same, wherein the word-level mask proportions are used to indicate a probability that a word is masked.

19. The data processing apparatus according to claim 7, wherein the mask proportions of the mask training samples that are unfixed comprise:

text-level mask proportions of different samples in the mask training samples that are not exactly the same, wherein the text-level mask proportions are used to indicate a proportion of masked words in a sample in all words in the sample; and/or word-level mask proportions of words in any of the mask training samples that are not exactly the same, wherein the word-level mask proportions are used to indicate a probability that a word is masked.

20. The chip according to claim 12, wherein text-level mask proportions of the mask training samples that are unfixed comprise:

text-level mask proportions of different samples in the mask training samples that are not exactly the same, wherein the text-level mask proportions are used to indicate a proportion of masked words in a sample in all words in the sample;

and/or word-level mask proportions of words in any of the mask training samples that are not exactly the same, wherein the word-level mask proportions are used to indicate a probability that a word is masked.

* * * * *